(12) United States Patent
Breed

(10) Patent No.: X7506
(45) Date of Patent: Apr. 4, 1833

(54) BOOTS & SHOES, ATTACHED SOLES, BY MEANS OF CAOUTCHOUC

(76) Inventor: Samuel D. Breed

Samuel D. Breed. Philadelphia P.a.

Letters Patent.

The Schedule, referred to in these Letters Patent and making part of the same, containing a description in the words of the said Samuel D. Breed himself of his improvement in the mode of attaching soles to the outsides of Boots and shoes of all descriptions.

To all whom it may concern:

Be it known that I, Samuel D. Breed of the City of Philadelphia in the State of Pennsylvania, have invented a new mode of attaching soles on to the outside of boots & shoes of all descriptions, whether made of leather, India rubber, or other materials, and that the following is a full & exact description of my said invention.—

My method of attaching the outside sole on to boots and shoes, is by cementing the parts together by means of a solution of caoutchouc or india rubber, as a substitute for the usual modes of sewing or pegging. - - —

For this purpose I disolve India rubber in rectified Spirits of turpentine; the essential oil of Sassafras or some other of the essential oils, I however prefer the oil of sassafras, to either of the others that I have tried.... When the shoes are made of leather I prepare the upper leather & the inner sole, in the usual manner.— I then saturate both soles with the solution of caoutchouc & if this is made of good materials, they will, in favorable weather, dry in the course of 12 hours The parts to be cemented are then covered with a portion of the solution; the boot or shoe, being on a last, is placed on a bed or support, of a suitable form, the outer sole placed on it, & covered by a plate of cast iron or any solid material, of a proper shape & submitted to that
degree of pressure, which shall suffice to bring into
contact all the parts that are to be united.— . . . . . . —
The pressure is to be continued until the cement has
become sufficiently dry which in fair weather; I have
found to take place in about 24 hours.— Soles of caoutch-
ouc or of leather may be Joined on to caoutchouc in the
same way; & socks or shoes, of woollen or other cloth may
have soles of leather, or of caoutchouc, attached to them
by similar means.....— In making the cement above
described I use the articles in such proportions as shall
give to the solution the consistency of strong paste. . . . . .
I do not claim to have discovered the mode of
making the solution of caouthouc by of the essential
oils, this being a process which has been long known;
but what I do claim as my invention is the application
of this solution to the cementing of soles on to boots &
shoes as a substitute for sewing or pegging.—

Witnesses
Benjn M. Hollingshead
R. M. Maddirk

Samuel D. Breed

Exd.
H.J.W.

517 [illegible]